(12) United States Patent
Roman et al.

(10) Patent No.: US 8,757,414 B2
(45) Date of Patent: Jun. 24, 2014

(54) BIN FOR COLLECTING SOLID WASTE

(75) Inventors: Guido Roman, Breganze (IT); Roberto De Toni, Malo (IT)

(73) Assignee: Leader Time S.r.l., Breganze (VI) (IT)

( * ) Notice: Subject to any disclaimer, the term of this patent is extended or adjusted under 35 U.S.C. 154(b) by 0 days.

(21) Appl. No.: 13/576,746

(22) PCT Filed: Feb. 21, 2011

(86) PCT No.: PCT/EP2011/000816
§ 371 (c)(1),
(2), (4) Date: Aug. 2, 2012

(87) PCT Pub. No.: WO2011/110283
PCT Pub. Date: Sep. 15, 2011

(65) Prior Publication Data
US 2012/0318791 A1  Dec. 20, 2012

(30) Foreign Application Priority Data
Mar. 9, 2010 (IT) .............. VI2010A0062

(51) Int. Cl.
*B65D 21/02* (2006.01)
*G01G 3/00* (2006.01)
*G01G 3/04* (2006.01)
*G01G 7/00* (2006.01)
*G01G 7/06* (2006.01)

(52) U.S. Cl.
CPC *B65D 21/02* (2013.01); *G01G 3/00* (2013.01); *G01G 3/04* (2013.01); *G01G 7/00* (2013.01); *G01G 7/06* (2013.01); *Y10S 220/908* (2013.01); *Y10S 220/9081* (2013.01)
USPC ....... 220/23.9; 220/23.87; 220/211; 220/260; 220/484; 220/908; 220/908.1

(58) Field of Classification Search
CPC ........... B65D 21/02; G01G 3/00; G01G 3/04; G01G 7/00; G01G 7/06
USPC .......... 220/23.87, 23.9, 908, 908.1, 211, 260, 220/484
See application file for complete search history.

(56) References Cited

U.S. PATENT DOCUMENTS 2,525,587 A * 10/1950 Cahn ............................. 177/211
5,900,592 A *  5/1999 Sohns et al. ............... 177/210 R

FOREIGN PATENT DOCUMENTS

| DE | 195 36 318 A1 | 4/1997 |
| DE | 198 35 762 A1 | 2/2000 |
| IT | VI930174 | 4/1995 |

OTHER PUBLICATIONS

International Search Report in PCT/EP2011/000816 mailed Jun. 28, 2011.
Written Opinion of the International Searching Authority in PCT/EP2011/000816 mailed Jun. 28, 2011.

* cited by examiner

*Primary Examiner* — Fenn Mathew
*Assistant Examiner* — Elizabeth Volz
(74) *Attorney, Agent, or Firm* — Bucknam & Archer

(57) ABSTRACT

Herein described is a bin for collecting solid waste, in particular urban waste, provided with a device for weighing the products deposited by a single user, of the type made up of two containers, the outer covering one and the inner one for collecting waste. Such bin includes a rigid frame arranged in the gap between the two containers. Such frame rests on four stanchions on the bottom of the more outer container, where the wheels are applied, whereas on the upper edge some load cells are arranged, which support the most inner container so as to be able to detect the weight of the waste deposited in the bin by the user.

9 Claims, 6 Drawing Sheets

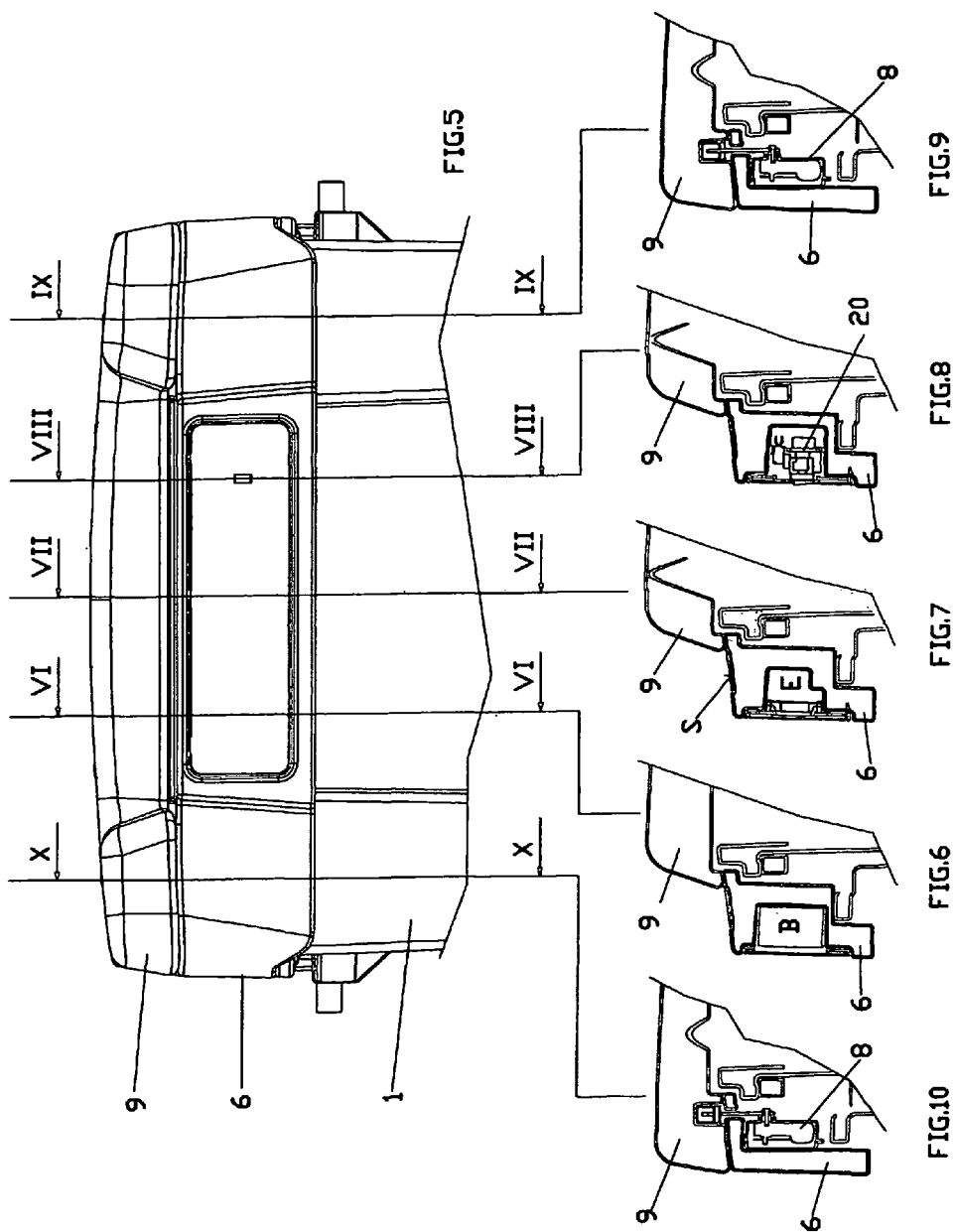

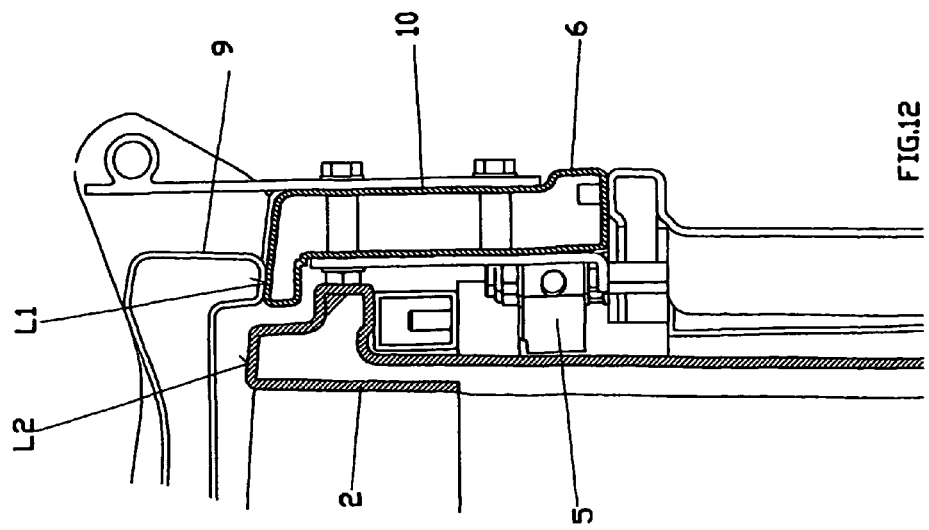
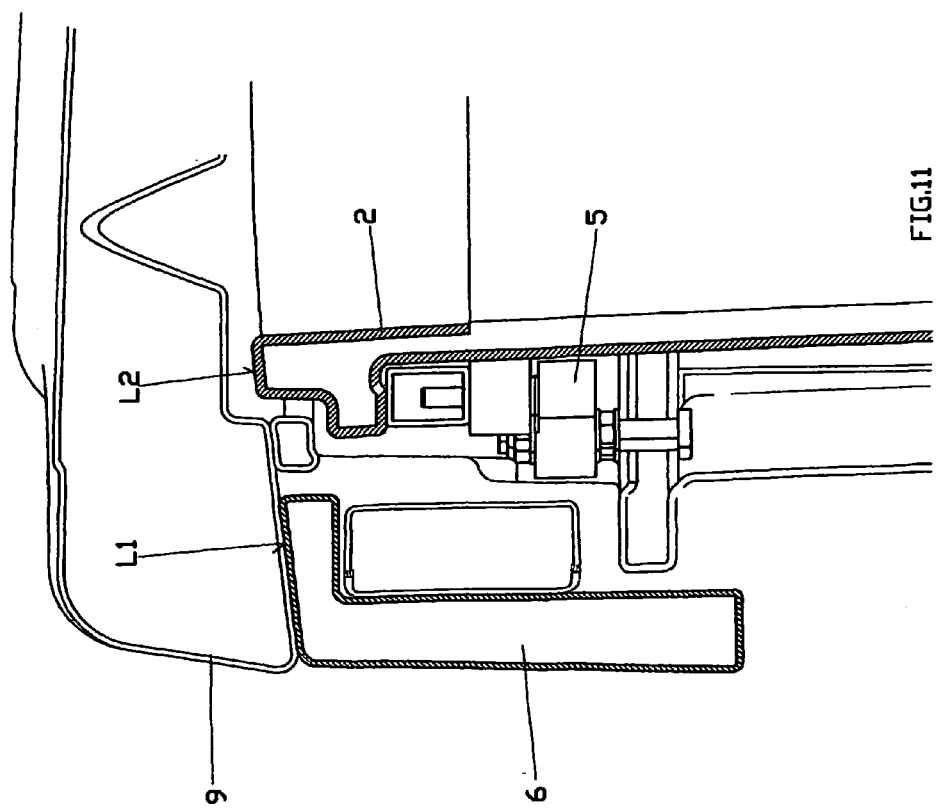

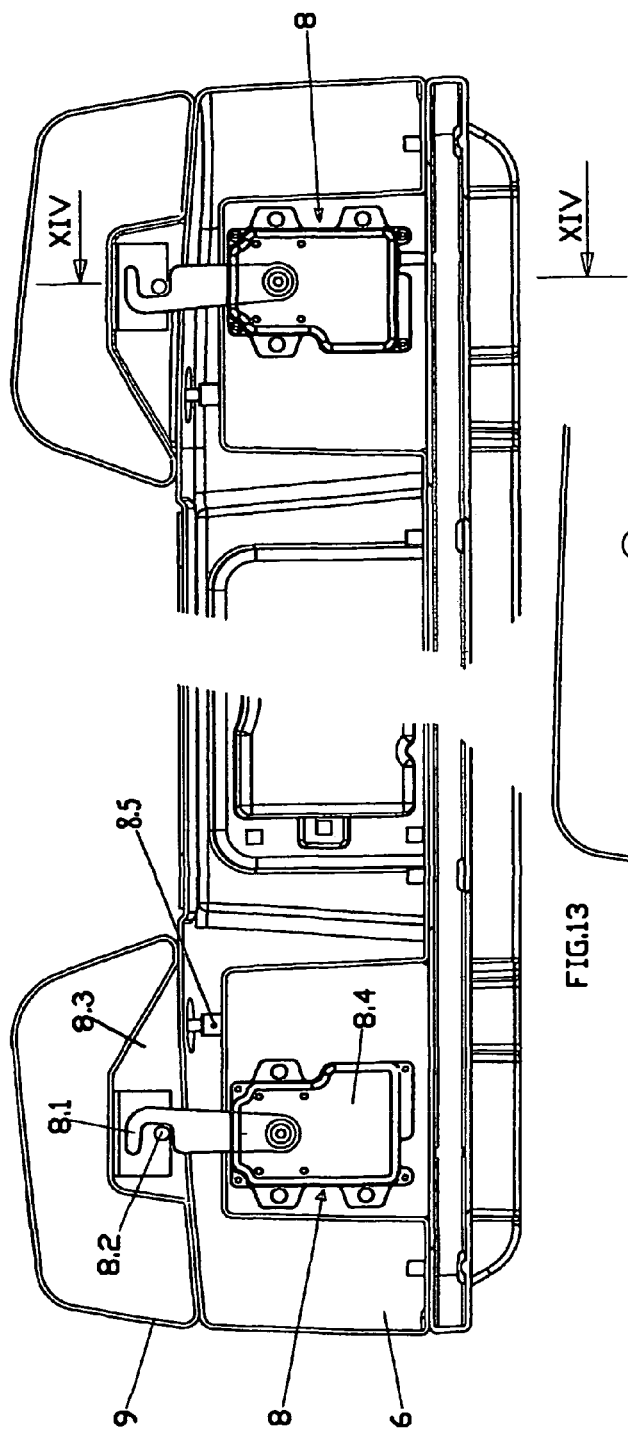
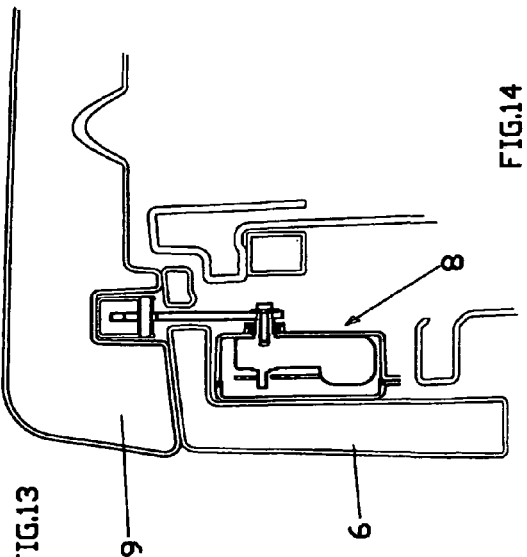

BIN FOR COLLECTING SOLID WASTE

CROSS REFERENCE TO RELATED APPLICATIONS

This application is the National Stage of PCT/EP2011/000816 filed on Feb. 21, 2011, which claims priority under 35 U.S.C. §119 of Italian Application No. VI2010A000062 filed on Mar. 9, 2010, the disclosure of which is incorporated by reference. The international application under PCT article 21(2) was published in English.

The present invention regards a bin for collecting solid waste, in particular urban waste, of the type provided with a device for weighing the amount of waste deposited by the user, according to the general part of claim 1.

Besides the so-called "door to door" system, solid urban waste is also collected by means of bins arranged at various points of the town where the user deposits the waste bag thereof and which are periodically emptied by the company designated therefor.

Some recent laws require that the taxation system regarding collection and disposal of solid urban waste to be applied to each citizen be modified, passing from the calculation method related to the value or surface area of the property of the single user, to the actual amount of solid urban waste the single user deposits into the bin. Such different taxation system requires that the waste collection organisation has accurate information regarding the amount of waste deposited by each and every user, into a specific bin, so as to be able to demand the right amount of money for the provided service.

According to the state of art, there are known various types of bins ranging from the simplest ones—like the one described in Italian patent application No. VI93A000174, in which it is provided for that the user has a card which, introduced into a column arranged beside the bin, allows opening the lid of the bin to enable emptying the bags—to the bins most advanced technologically, such as the one described in Italian patent application No. VI97A000112, which include, therein, mechanical and electronic devices associated to a software which detect and process all parameters regarding the use of the bin including the weight of the waste deposited by the single user each time and over a given period as well as the operating conditions of the bin, such as the filling level and the management of the emptying operations; all connected by means of a computer with the company managing waste collection and disposal.

According to the state of art, such bins still reveal drawbacks, both construction and operative, such as a complex construction and thus implying high purchase and maintenance costs. Furthermore, they reveal the drawback lying in the fact that the user can alter the weight of the products deposited and emptied thereinto. An object of the present invention is to provide a bin for collecting solid waste, in particular urban waste, provided with mechanical and electronic devices as well as a software for detecting the amount of waste deposited by the single user, free of the drawbacks revealed by similar prior art devices.

Such object is attained by providing a bin of the type made up of two containers, the more inner one for collecting waste and the more outer one for covering, characterised in that it has a rigid frame, arranged in the gap generated between the walls of said two containers and which serves as an element for supporting the entire structure.

Specifically, said rigid frame has the purpose of preventing the collapse of the outer container which, being made by means of moulding, has low resistance (in particular when it is made through rotary moulding). Furthermore, said intermediate frame, given that it is not noticeable from outside, confers the bin better aesthetic qualities. From a construction point of view, said frame is provided with at least two wheels provided with a locking motor group, which is actuated through the control electronic elements, so that the unlocking, to allow the movement of the bin, can be carried out solely by the authorised person (for example through an electronic key given solely to the operators designated to empty the bin). From a construction point of view, at the upper part of said frame where the load cells, which support the internal container to detect the weight of the deposited waste, are applied, there lies a housing, on which there is hinged the lid for covering the bin.

The particular double-wall configuration of the housing allows positioning, therein, operating electronic means arranged in an airtight and easily accessible gap, to allow easy replacement of the rechargeable battery.

Still in the abovementioned airtight gap, there is also housed the group for reading the transponder key, provided with a device for blocking the real key; said blocking is fundamental to the good operation of the bin, in that it requires the user to perform all the operations required to deposit the waste correctly so as to be able to withdraw the key at the end of the operations.

Furthermore, the profile of the inner container projects higher with respect to the profile of the housing and this allows preventing the user—by tying a cord to the bag—from reducing the weight of the deposited product.

Still in the housing there are laterally housed the motors for locking the lid, which are provided with hooks mutually oriented opposite to each other, to prevent any ill-intentioned subjects from opening the lid in any manner whatsoever.

The invention shall be described in detail hereinafter through the description of a possible embodiment thereof, provided solely by way of non-limiting example with the reference to the attached drawings, wherein.

Figure 16:
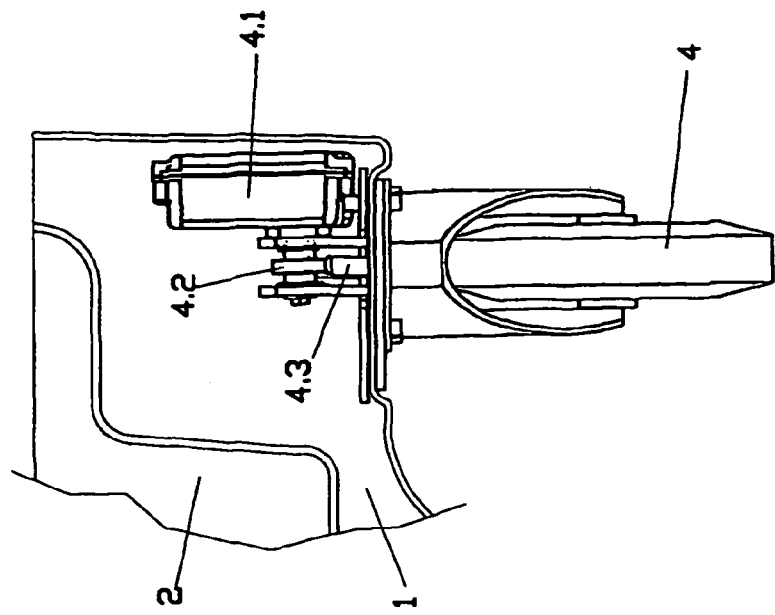
Figure 15:
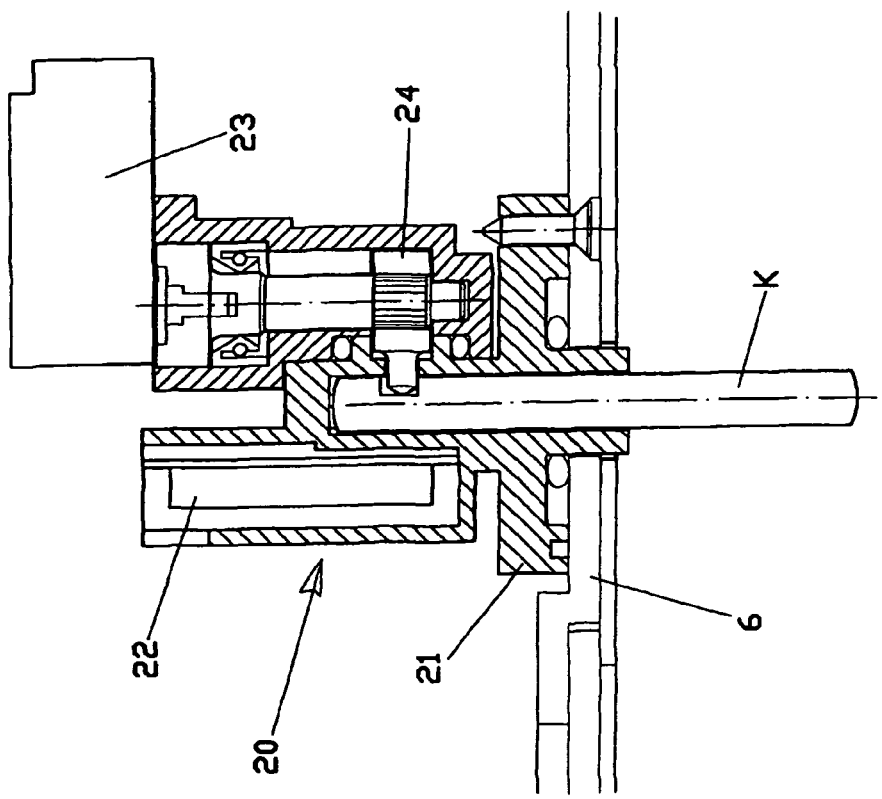

FIGS. 5-10 (tav. III) respectively represent a cross-sectional front and side views of the housing;

FIGS. 11-12 (tav. IV) represent two cross-sectional views of the zones, respectively, front and rear, for closing the bin;

FIGS. 13-14 (tav. V) represent two views, respectively cross-sectional front and side, of the system for engaging the lid;

FIG. 15 (tav. VI) represent a cross-sectional view of the key locking group;

FIG. 16 represents a detailed view of the wheel-lock group.

Figure 1:
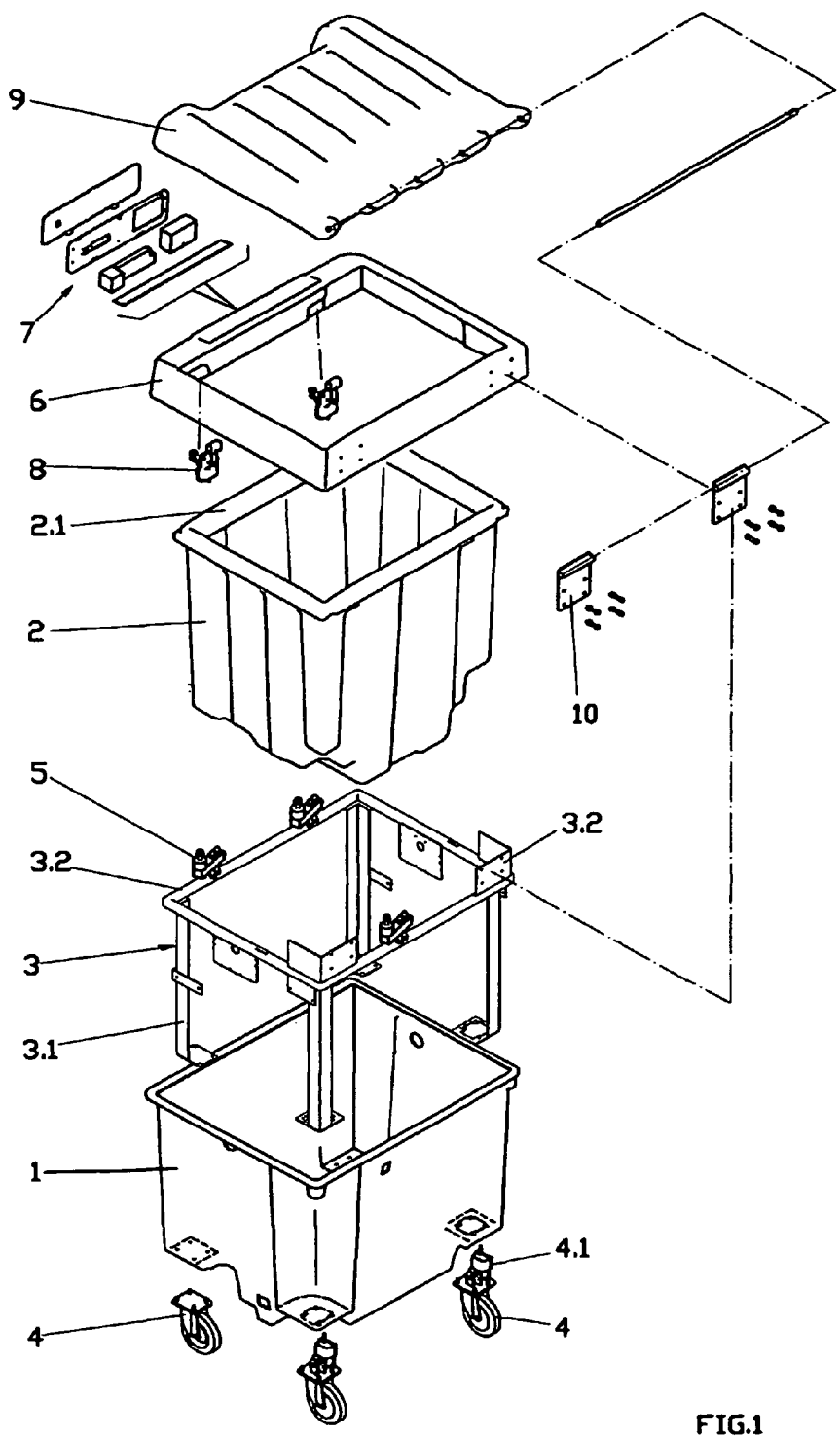
FIG. 1 (tav. I) represents an exploded perspective view of the bin according to the invention.
Figure 4:
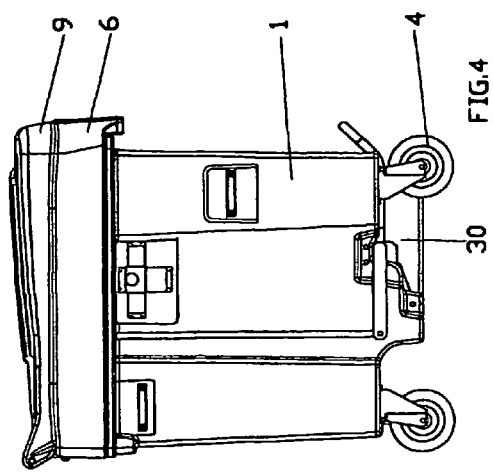
FIGS. 2-4 (tav. II) represent three orthogonal views of the bin according to the invention.

As observable in FIG. 1, the bin according to the invention is of the type made up of two containers, the outer one 1 for covering, and the inner one 2, for collecting waste: it is mainly characterised by the presence of a rigid frame, indicated with reference 3, arranged in the gap between said two containers, which rest with the four stanchions 3.1 on the bottom of the more outer container 1, where the wheels 4 are applied: advantageously, upon request by the user, at least two wheels are provided with locking motor group 4.1.

A plurality of load cells 5, which support the more inner container 2, so as to detect the weight of the waste deposited by the user into the bin is arranged on the upper edge 3.2 of the frame 3; said load cells are three or more, depending on the size of the bin.

The structure of the bin is completed with a housing 6 which, positioned at the upper part with respect to the inner container 2, covers the upper edge thereof on the four sides 2.1, so as to reduce the gap between the two containers to the minimum.

The housing 6 has a double-wall section, which allows holding the operating members of the bin indicated in their entirety with reference 7 and the two groups 8 for locking the lid 9.

Said housings 6 and lid 9 are mutually hinged through the hinges 10 made integral with the brackets 3.2 of the frame 3.

Figure 3:
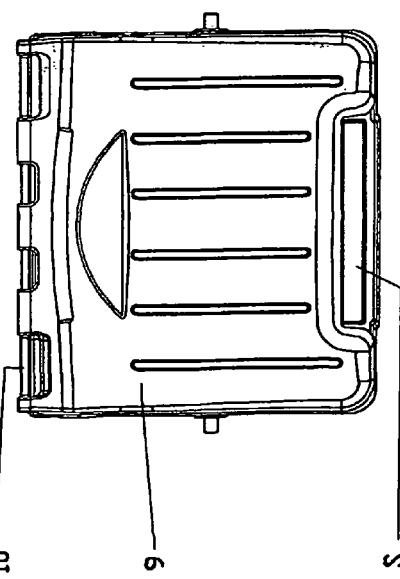
Figure 2:
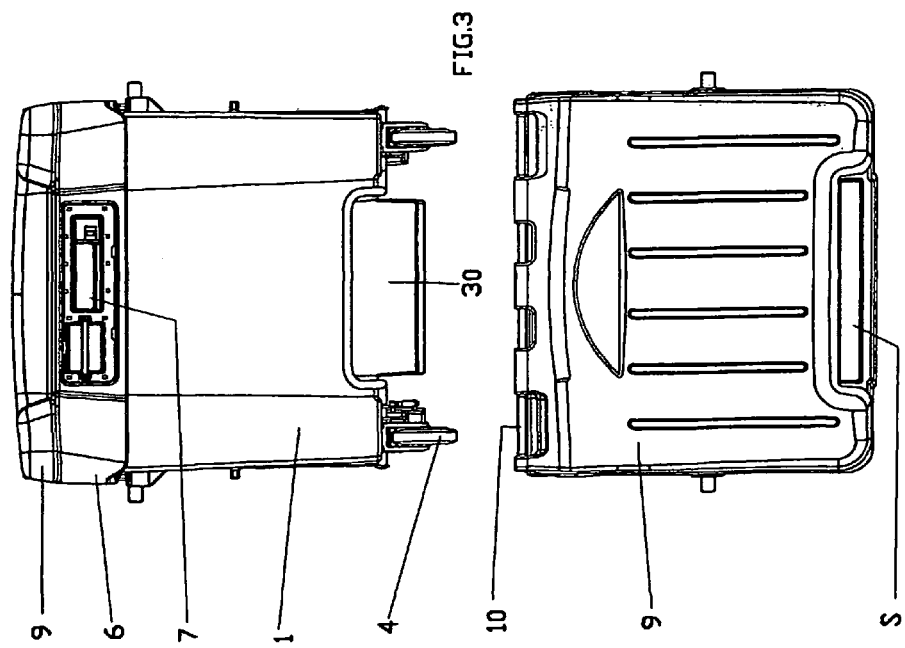

More in detail, as observable in FIG. 3, the housing 6 has a closed-section profile and variably-shaped configuration which allows, at the front portion and accessible to the user from outside, to obtain a gap for the insertion of the battery "B" (see FIG. 6), a gap for the insertion of the electronic control unit "E" (see FIG. 7) and the motorised group 20 for locking the user key (see FIG. 8) and furthermore, still at the front portion, but internally, also the positioning of the two lid locking groups 8 (see FIGS. 9-10).

Still on the housings 6 there is positioned the photovoltaic cell "S".

Furthermore, as observable in FIGS. 11-12, the upper edge L2 of the inner container 2 is higher with respect to the upper edge L1 of the housing 6: such configuration prevents an ill-intentioned subject from depositing the waste bag withholding it with a cord hence altering the weight thereof in that said cord, when the lid closes always operates on the edge of the inner container, which is supported by the load cells.

As observable in FIGS. 13-14, the two lid locking groups 8, arranged at the two ends of the bin, are constituted by two opposite hooks 8.1 which, at closing position, are engaged with the pins 8.2 arranged in the gap 8.3 obtained in the lid 9; each of said hooks is actuated by a gearmotor 8.4 adjusted through a lid closing sensor 8.5, all being totally inaccessible from the outside.

As observable in FIG. 15, the opening/closure of the lid of the bin is adjusted through a motorized user key locking group, indicated with reference 20, inserted in the front gap of the housing 6 made up of a body 21 containing the electronic card 22 for reading the key "K" and the motor 23, which actuates the key locking actuator 24, all operating in such a manner that the electronic transponder key, besides allowing the personalized opening of the lid, also allows the blocking of the real key in the slot over the entire period of time of depositing, withdrawal thereof being possible solely upon the closure of the lid again.

As observable in FIG. 16, the locking of the wheel is obtained through the motor 4.1, which actuates a cam 4.2, which is engaged on the pin 4.3 for locking said wheel.

Lastly, as observable in FIGS. 3/4, the bin is provided, at the lower part thereof, with an additional volume 30, obtained with a particular shaping of the bottom of the outer container 1, so as to enable having—considering the same outer overall dimension—a considerably greater useful inner space.

The invention thus conceived, can be subjected to numerous modifications and variants; details thereof can be replaced by technically equivalent elements, just like the materials used for providing the two containers can be different, as along the entirety falls within the invention concept defined by the following claims.

The invention claimed is:

1. A bin for collecting solid urban waste and weighing the waste deposited by a single user, said bin comprising an outer container (1) and an inner container (2) having a gap therebetween, said waste being collected in said inner container, a rigid frame (3) arranged in said gap and resting with four stanchions (3.1) on a bottom surface of said outer container (1), wheels (4) supporting said bin applied to said stanchions (3.1), and load cells (5) arranged on an upper edge (3.2) of said frame (3) which support said inner container (2) and detects the weight of said waste deposited in the inner container by the user.

2. The bin according to claim 1, which further comprises a motor (4.1) for actuating a cam (4.2) which engages a pin (4.3) which locks one of said wheels (4).

3. The bin according to claim 1, which further includes a volume (30) arranged in a lower part obtained through a shaping of the bottom of said outer container (1).

4. The bin according to claim 1, further comprising a housing (6) arranged above said inner container (2) so as to cover an upper edge (2.1) on four sides of said inner container, said housing (6) including a section for operating members (7) of said bin and two locking groups (8) for locking a closing lid (9) closing said bin, and hinges (10) fixedly connected to brackets (3.2) of said frame (3) hingedly connecting together said housing (6) and said closing lid (9).

5. The bin according to claim 4, wherein said housing (6) has a front portion having a closed profile of variable shape accessible by an operator for the insertion of a battery (B) and including a water-tight space for the insertion of an electronic control group (E) and a motorized user key locking group (20), said closing lid locking groups (8) being arranged at an inside edge of said housing (6).

6. The bin according to claim 4, wherein a photovoltaic cell (S) is arranged on said housing (6).

7. The bin according to claim 4, wherein said inner container (2) has an uppermost edge (L2) disposed higher than an upper edge (L1) of said housing (6).

8. The bin according to claim 4, wherein said two lid locking groups (8) are each arranged at an opposing end of said bin and comprise opposing hook fasteners (8.1) adapted for engagement with pins (8.2) arranged in gaps (8.3) formed on said closing lid (9), each of said hook fasteners (8.1) being actuated for engagement with said pins (8.2) by a gearmotor (8.4) adjusted through a lid closing sensor (8.5), each of said hook fasteners, pins, gearmotors and lid closing sensors being inaccessible from an exterior of said bin.

9. The bin according to claim 4, which further includes a motorized user key locking group (20) for regulating the opening and closing of said closing lid (9) housed in a gap formed in a front portion of said housing (6), said user key locking group comprising a body (21) containing an electronic reading card (22) adapted to read an electronic key (K), and a motor (23) for actuating a key locking actuator (24) so that the electronic key (K) allows the personalized opening of the closing lid (9) by the user and the blocking of the key (K) in the key locking group (20) by the locking actuator (24) until the closing lid (9) is closed.

\* \* \* \* \*